(12) United States Patent
Motter et al.

(10) Patent No.: US 11,014,618 B2
(45) Date of Patent: May 25, 2021

(54) REAR FAIRING ASSEMBLIES FOR A CARGO ENCLOSURE

(71) Applicant: Transtex LLC, Lebanon, IN (US)

(72) Inventors: Andrew Alan Motter, Simpsonville, SC (US); Nathan David See, Omaha, NE (US)

(73) Assignee: TRANSTEX LLC, Lebanon, IN (US)

( * ) Notice: Subject to any disclaimer, the term of this patent is extended or adjusted under 35 U.S.C. 154(b) by 220 days.

(21) Appl. No.: 16/235,440

(22) Filed: Dec. 28, 2018

(65) Prior Publication Data

US 2020/0207426 A1  Jul. 2, 2020

(51) Int. Cl.
*B62D 35/00* (2006.01)

(52) U.S. Cl.
CPC ......... *B62D 35/001* (2013.01); *B62D 35/008* (2013.01); *B62D 35/007* (2013.01)

(58) Field of Classification Search
CPC ... B62D 35/001; B62D 35/008; B62D 35/007
USPC ...................... 296/180.4, 180.1, 180.5, 181.5
See application file for complete search history.

(56) References Cited

U.S. PATENT DOCUMENTS

| | | | | |
|---|---|---|---|---|
| 3,960,402 A * | 6/1976 | Keck | ................... | B62D 35/001 296/180.4 |
| 6,257,656 B1 | 7/2001 | Cook et al. | | |
| 6,425,507 B1 | 7/2002 | Allen | | |
| 7,625,034 B1 * | 12/2009 | Fitzgerald | ............ | B62D 35/001 296/180.1 |
| 7,641,262 B2 * | 1/2010 | Nusbaum | ............ | B62D 35/001 296/180.5 |
| 8,177,287 B2 | 5/2012 | Vogel et al. | | |
| 8,973,974 B2 * | 3/2015 | Kunkel | ................ | B62D 35/001 296/180.4 |
| 9,085,330 B2 | 7/2015 | Fritts | | |
| 9,126,641 B1 | 9/2015 | Sato | | |
| 9,199,676 B2 | 12/2015 | Brown et al. | | |
| 9,440,688 B2 | 9/2016 | Smtih et al. | | |
| 9,926,019 B1 | 3/2018 | Bennett et al. | | |
| 9,937,964 B2 | 4/2018 | Ryan et al. | | |
| 2008/0116715 A1 | 5/2008 | Steel | | |
| 2010/0201153 A1 | 8/2010 | Pesotini, Jr. | | |
| 2018/0093715 A1 | 4/2018 | Miller et al. | | |

FOREIGN PATENT DOCUMENTS

FR       2781740 A1     9/2000

OTHER PUBLICATIONS

TRP, Aerodynamic Skirts & Panels, 8 pages, dated May 18, 2011.
eTrailer. Rhino-Rack Fairing for Roof Racks, 11 pages.

* cited by examiner

*Primary Examiner* — D Glenn Dayoan
*Assistant Examiner* — E Turner Hicks
(74) *Attorney, Agent, or Firm* — Chad D Tillman; Tillman Wright, PLLC

(57) ABSTRACT

A rear fairing assembly for a cargo enclosure includes a fairing bracket configured to be coupled to an enclosure wall of the cargo enclosure. In addition, the rear fairing assembly includes a separate fairing skin supported relative to the enclosure wall via the fairing bracket.

20 Claims, 7 Drawing Sheets

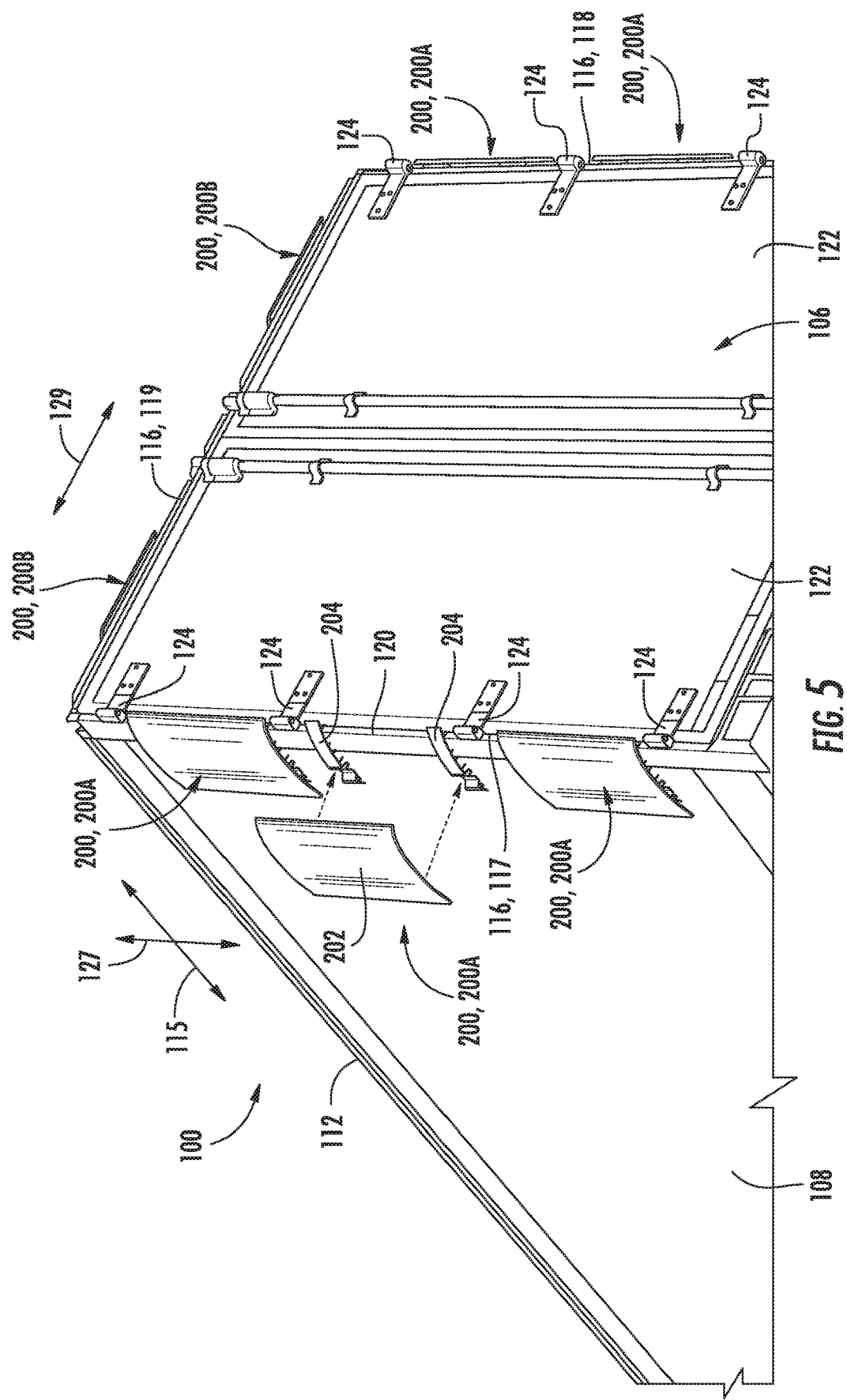

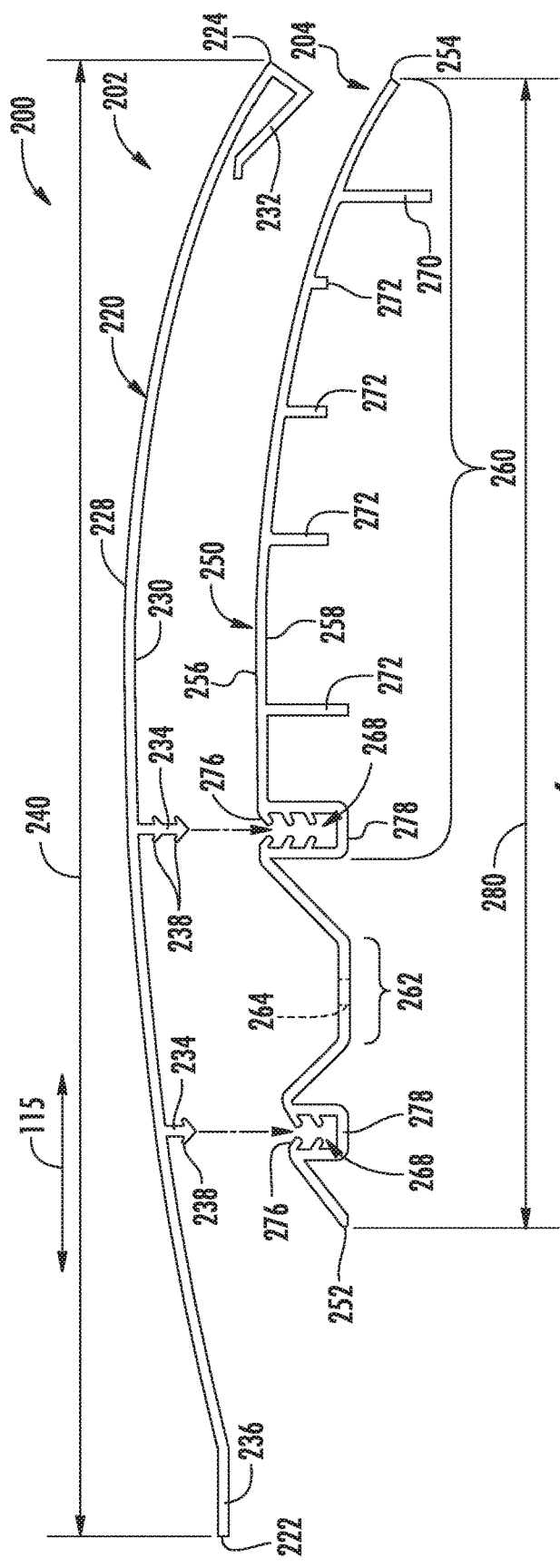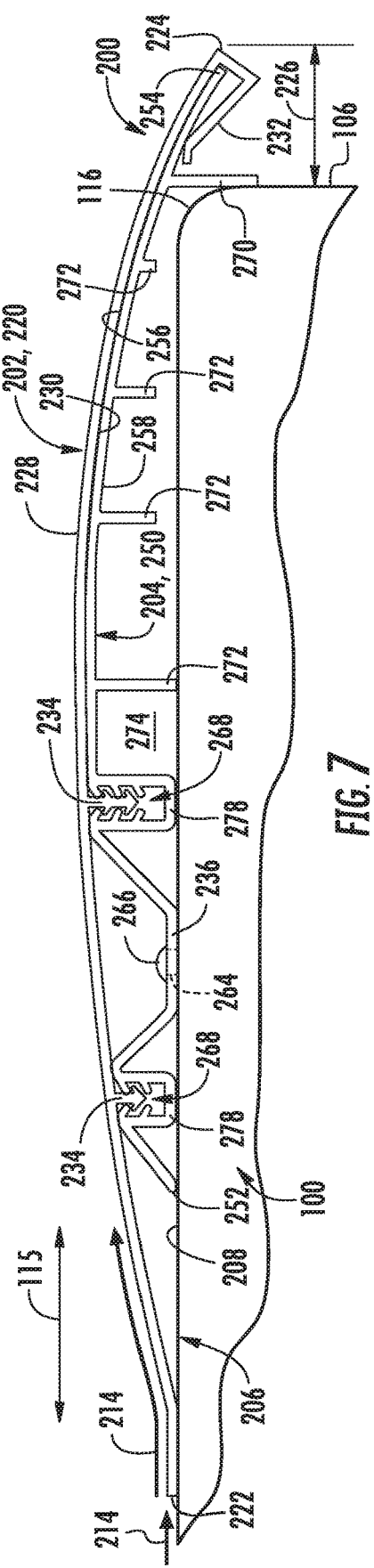

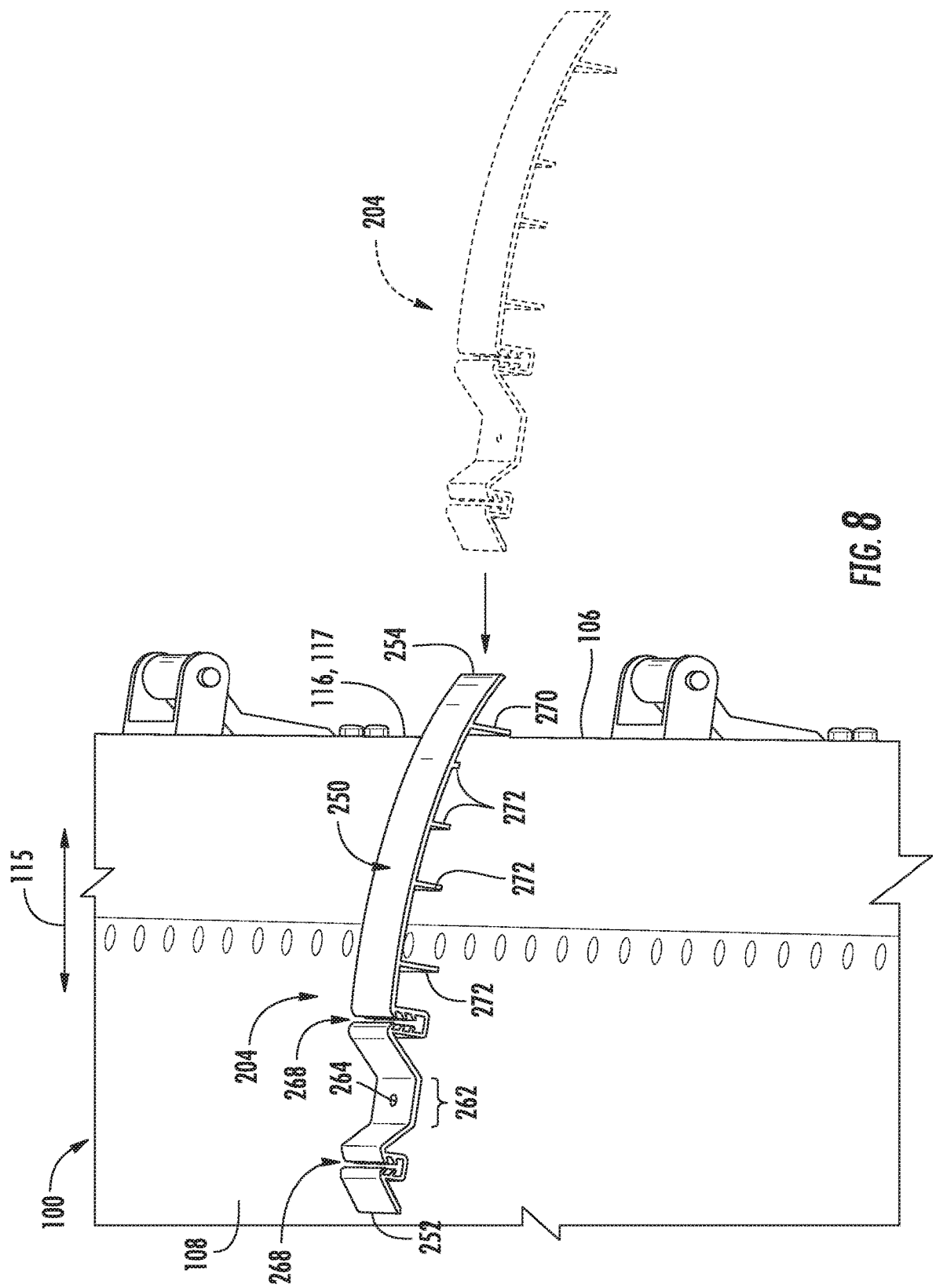

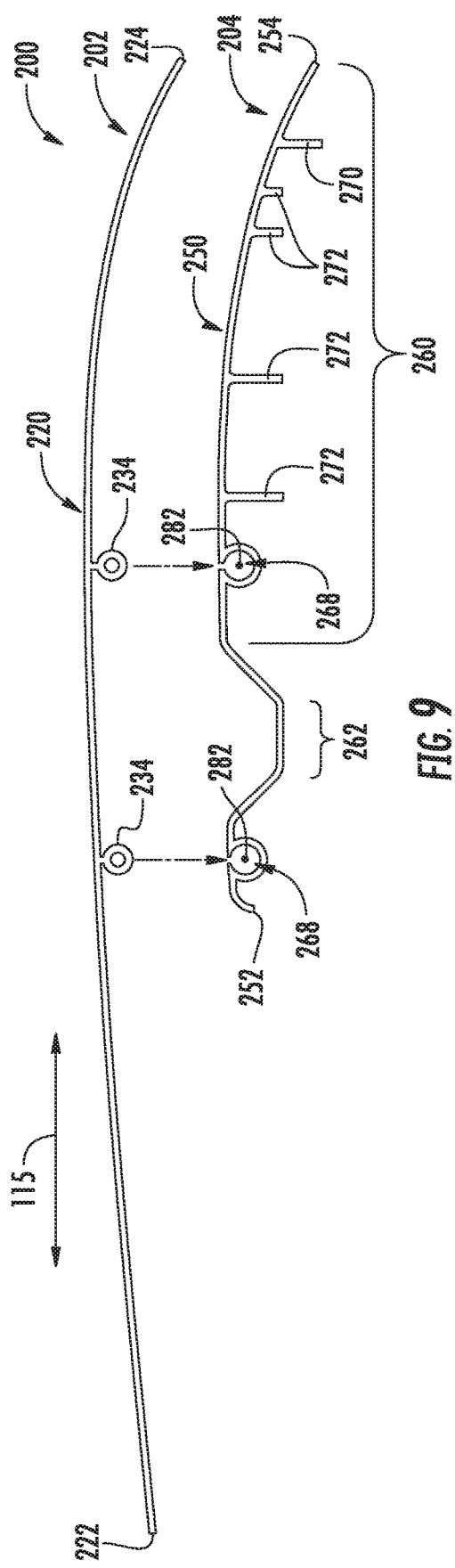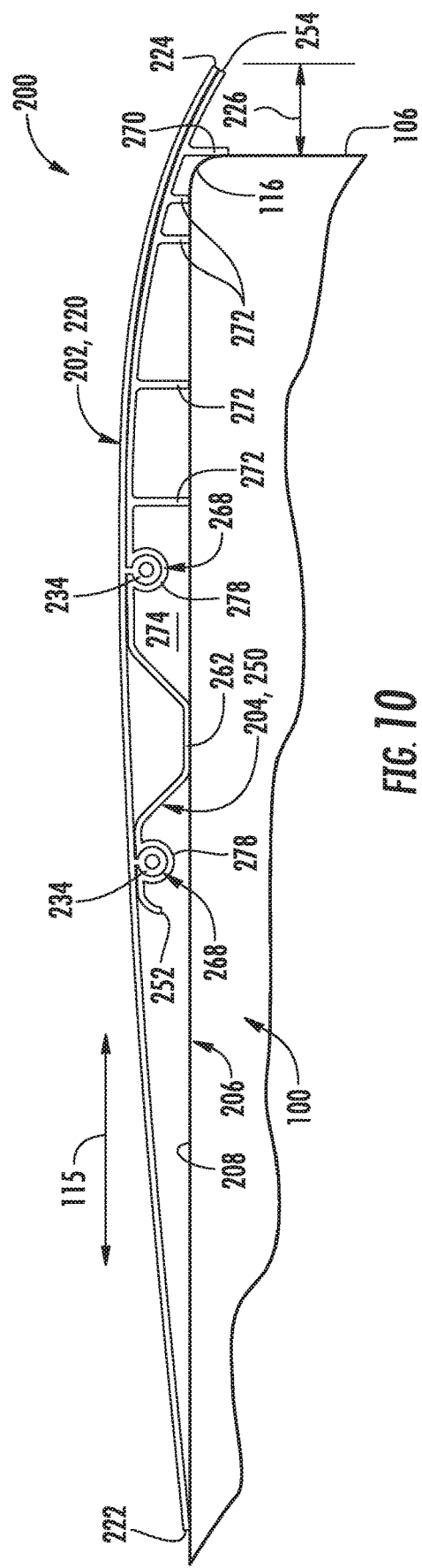

REAR FAIRING ASSEMBLIES FOR A CARGO ENCLOSURE

FIELD OF THE INVENTION

The present subject matter relates generally to aerodynamic fairing assemblies for cargo enclosures and, more particularly, to rear fairing assemblies configured to be installed adjacent to a rear peripheral edge of a cargo enclosure, such as the rear side edges of a cargo enclosure and/or the rear top edge of a cargo enclosure.

BACKGROUND OF THE INVENTION

An ongoing effort to reduce drag in vehicular structures and associated cargo enclosures is of great importance as fuel economy becomes an increasingly large consideration in the overall design of a vehicle and/or its associated cargo enclosure. As the drag increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles such as tractor-trailers (also known as semi tractors, tractors, class 8 long haul trucks, transfer trucks, 18-wheelers, semis, etc.) have a tall and wide box-shaped profile that creates a significant amount of drag compared to smaller vehicles on the road. For instance, Table I lists common drag coefficients of road vehicles.

TABLE I

| Type of Vehicle | Drag Coefficient (Cd) |
| --- | --- |
| Low Drag Production Car | .26 |
| Typical Sedan | .3-.35 |
| Sport Utility Vehicle | .4-.5 |
| Pick-up Truck | .4-.5 |
| Conventional Class 8 long haul tractor trailers | .59-.63 |

Additionally, conventional cargo enclosures often have a similarly tall and wide box-shaped profile that creates a significant amount of drag. For example, trailers typically define an enclosed cargo space that is rectangular in shape. For example, the most common type of cargo trailer in the U.S. is a dry box van that is 53 feet long.

Various devices have been developed in the past to address certain areas of drag on a vehicle and/or its associated cargo enclosure, such on a tractor-trailer combination. However, these devices often have significant limitations in their ability to reduce drag and/or their ability to be easily integrated into fleet operations. As a result, a comprehensive solution for reducing vehicle drag is still needed.

Thus, a need exists for an improved aerodynamic fairing assembly designed to provide drag reduction for a cargo enclosure that is included within or configured to be coupled to or hauled by a vehicle. Retrofit kits for incorporating such devices onto a cargo enclosure would also be beneficial. Moreover, methods relating to the utilization of such devices would also be beneficial.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a cargo enclosure for storing cargo. The cargo enclosure may include a rear wall, an enclosure wall intersecting the rear wall at a rear peripheral edge of the cargo enclosure, and a rear fairing assembly installed relative to the enclosure wall. The rear fairing assembly includes a fairing bracket extending in a lengthwise direction between a forward end and an aft end, with the fairing bracket being coupled to the enclosure wall adjacent to the rear peripheral edge of the cargo enclosure such that the forward end of the fairing bracket is positioned forward of the rear peripheral edge in the lengthwise direction and the aft end is positioned rearward of the rear peripheral edge in the lengthwise direction. In addition, the rear fairing assembly includes a fairing skin supported relative to the enclosure wall via the fairing bracket. The fairing skin extends in the lengthwise direction between a leading edge and a trailing edge. Moreover, the fairing skin is coupled to the fairing bracket such that the fairing skin extends over and at least partially covers the fairing bracket in the lengthwise direction between the forward and aft ends of the fairing bracket, with the trailing edge of the fairing skin being positioned adjacent to the aft end of the fairing bracket at a location rearward of the rear peripheral edge of the cargo enclosure in the lengthwise direction.

In another aspect, the present subject matter is directed to a kit for retrofitting an existing cargo enclosure, wherein the cargo enclosure includes a rear wall, and an enclosure wall intersecting the rear wall at a rear peripheral edge of the cargo enclosure. The kit may generally include a rear fairing assembly configured to be installed relative to the enclosure wall. The rear fairing assembly includes a fairing bracket extending in a lengthwise direction between a forward end and an aft end, with the fairing bracket being configured to be coupled to the enclosure wall adjacent to the rear peripheral edge of the cargo enclosure such that the forward end of the fairing bracket is positioned forward of the rear peripheral edge in the lengthwise direction and the aft end is positioned rearward of the rear peripheral edge in the lengthwise direction. In addition, the kit includes a fairing skin configured to be supported relative to the enclosure wall via the fairing bracket, with the fairing skin extending in the lengthwise direction between a leading edge and a trailing edge. The fairing skin is coupled to the fairing bracket such that the fairing skin extends over and at least partially covers the fairing bracket in the lengthwise direction between the forward and aft ends of the fairing bracket, with the trailing edge of the fairing skin configured to be positioned adjacent to the aft end of the fairing bracket at a location rearward of the rear peripheral edge of the cargo enclosure in the lengthwise direction.

In yet another aspect, the present subject matter is directed to a method for retrofitting a cargo enclosure including a rear wall, and an enclosure wall intersecting the rear wall at a rear peripheral edge of the cargo enclosure. The method may include installing a rear fairing assembly configured in accordance with aspects of the present subject matter at or adjacent to the rear peripheral edge of the enclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates the same perspective view of the rear of the cargo enclosure shown in FIG. 4, except that one of the fairing assemblies is shown in an exploded view in which a fairing skin of the assembly is exploded away from corresponding fairing brackets of the assembly;

FIG. 6 illustrates an exploded side view of an example embodiment of a rear fairing assembly suitable for use as one of the rear fairing assemblies shown in FIGS. 4 and 5;

FIG. 7 illustrates an assembled side view of the rear fairing assembly shown in FIG. 6, particularly illustrating the fairing assembly installed relative to the rear peripheral edge of a cargo enclosure:

FIG. 8 illustrates a partial perspective view of a bracket of the rear fairing assembly shown in FIGS. 6 and 7 being installed relative to a sidewall of a cargo enclosure;

FIG. 9 illustrates an exploded side view of another example embodiment of a rear fairing assembly suitable for use as one of the rear fairing assemblies shown in FIGS. 4 and 5; and FIG. 10 illustrates an assembled side view of the rear fairing assembly shown in FIG. 9, particularly illustrating the fairing assembly installed relative to the rear peripheral edge of a cargo enclosure.

DETAILED DESCRIPTION OF THE INVENTION

Figure 1:
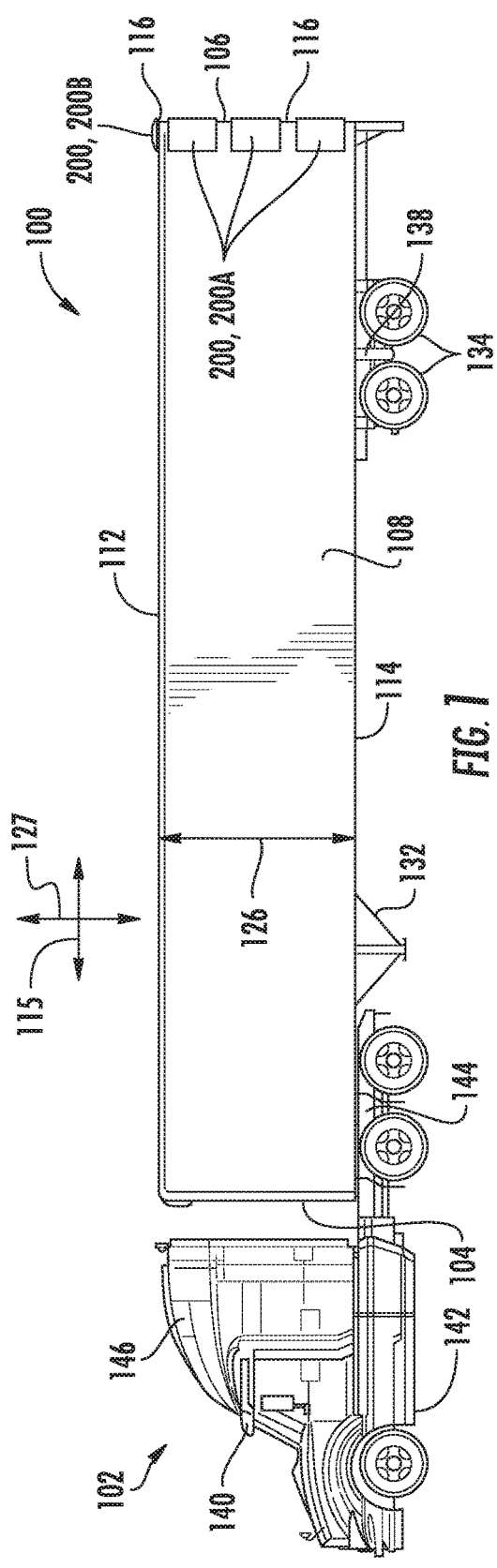
FIG. 1 illustrates a side view of one embodiment of a cargo enclosure configured in accordance with aspects of the present subject matter, particularly illustrating the cargo enclosure being coupled to a tractor and including rear fairing assemblies installed relative to a rear peripheral edge of the enclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to aerodynamic fairing assemblies positioned or configured to be installed adjacent to the rear end of a cargo enclosure to reduce the amount of drag on the enclosure as it is being hauled or transported. Specifically, in several embodiments, one or more rear fairing assemblies may be positioned or installed along the sidewalls and/or the top wall of the cargo enclosure at or adjacent to its rear peripheral edge (e.g., the edge defined between the rear wall of the enclosure and one or more of the sidewalls and/or the top wall of the enclosure). As will be described below, each rear fairing assembly may include one or more brackets configured to be coupled to one or more of the walls of the cargo enclosure and a separate fairing skin configured to be coupled to the bracket (s) such that the skin is supported relative to the adjacent wall(s) of the enclosure at or adjacent to its rear peripheral edge. Thus, the bracket(s) of each fairing assembly generally corresponds to the structural component(s) of the assembly while the fairing skin generally corresponds to the aerodynamic component of the assembly.

As will be apparent from the description provided herein, the disclosed fairing assemblies provide an effective and efficient drag-reducing solution for cargo enclosures. Specifically, the disclosed brackets are configured to be quickly and easily installed onto a cargo enclosure without requiring skilled labor or complex instructions. Moreover, the separate fairing skins allow for the aerodynamic component of each fairing assembly to be separately installed/removed relative to the associated bracket(s). As a result, if the fairing skin is damaged or should otherwise be replaced, a new fairing skin can be installed onto the existing brackets without requiring the entire system to be re-installed relative to the cargo enclosure.

Figure 2:
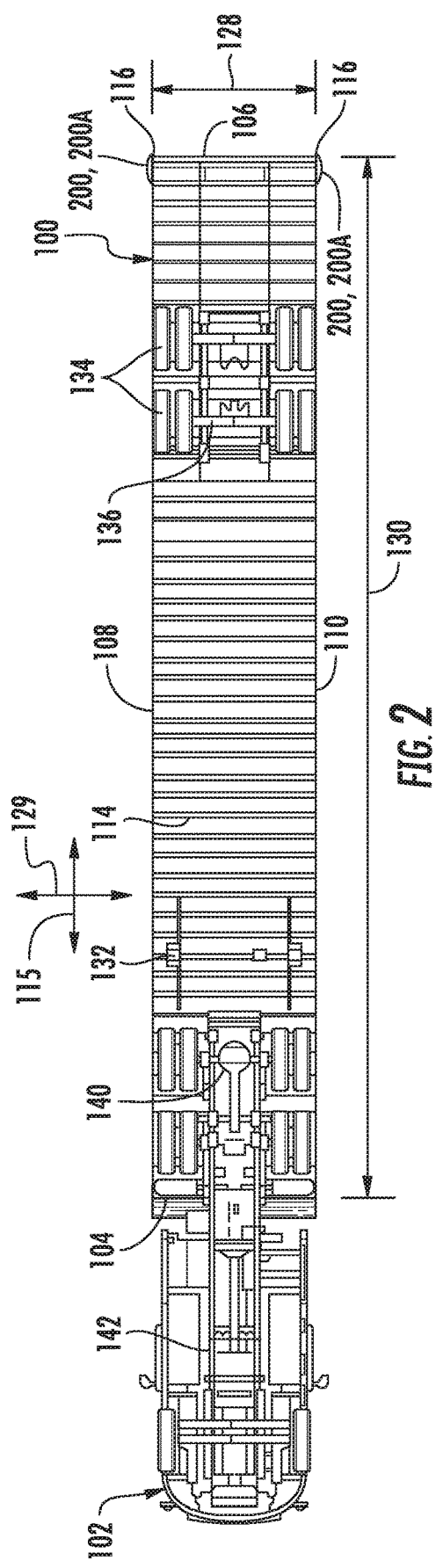
FIG. 2 illustrates a bottom view of the cargo enclosure and tractor shown in FIG. 1.
Figure 3:
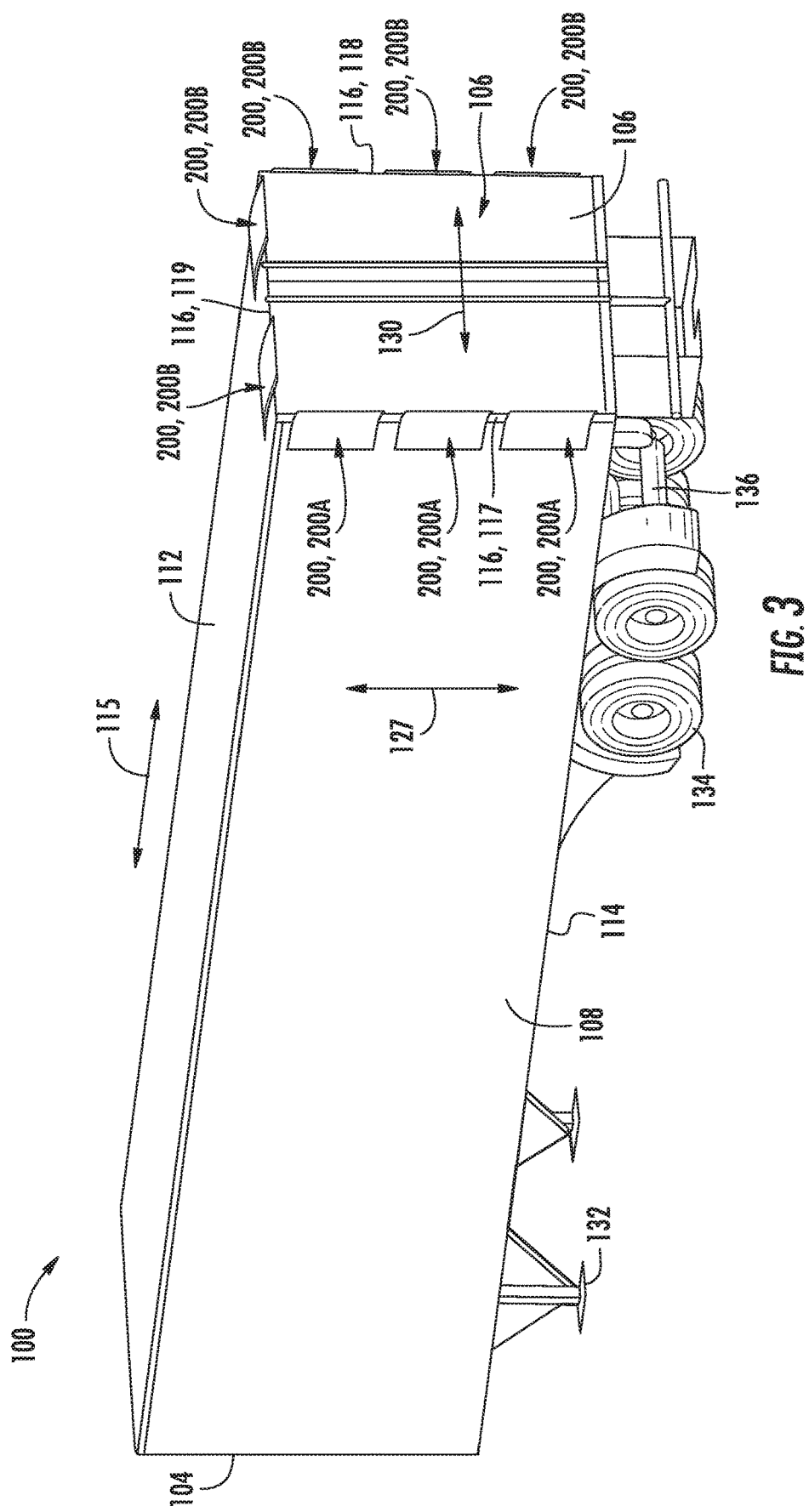
FIG. 3 illustrates a rear, perspective view of the cargo enclosure shown in FIGS. 1 and 2, particularly illustrating the rear fairing assemblies installed relative to the rear of the enclosure.

Referring now to FIGS. 1-3, several views of one embodiment of a cargo enclosure 100 onto which one or more of the disclosed fairing assemblies 200 may be installed is illustrated in accordance with aspects of the present subject matter. Specifically, FIGS. 1 and 2 illustrate side and bottom views, respectively, of the cargo enclosure 100 coupled to a tractor 102 in accordance with aspects of the present subject matter. Additionally, FIG. 3 illustrates a rear perspective view of the cargo enclosure 100 shown in FIGS. 1 and 2.

In several embodiments, the cargo enclosure 100 may generally define an enclosed space or volume for storing cargo. For example, as shown in FIGS. 1-3, the cargo enclosure 100 may, in one embodiment, define a rectangular storage space bounded along its sides by a front wall 104, a rear wall 106 and a plurality of additional enclosure walls 108, 110, 112, 114 extending between the front and rear walls 104, 106 in a lengthwise direction 115 of the cargo enclosure 100. For instance, in one embodiment, the cargo enclosure may include opposed sidewalls (e.g., a first sidewall 108 and a second sidewall 110), a top wall 112, and a bottom wall 114 extending between the front and rear walls 104, 106 in the lengthwise direction 115. As is generally understood, the top wall 112 may generally define the top or roof of the enclosed space and the bottom wall 114 may generally define the bottom or floor of the enclosed space. Similarly, the sidewalls 108, 110 may generally define the opposed sides of the enclosed space. It should be appreciated that, in other embodiments, the various enclosure walls 104, 106, 108, 110, 112, 114 of the cargo enclosure 100 may be configured in any other manner such that the enclosure 100 defines a storage space having any other suitable shape.

As particularly shown in FIG. 3, the cargo enclosure 100 may define a rear peripheral edge 116 extending along at least a portion of the perimeter of the rear wall 106 at the intersection between the rear wall 106 and the various other adjacent walls/surfaces of the enclosure 100. For example, the rear peripheral edge 116 may incorporate a first rear side edge 117 defined at the intersection between the rear wall 106 and the first sidewall 108 of the enclosure 100, and a second rear side edge 118 defined at the intersection between the rear wall 104 and the second sidewall 110 of the enclosure 100. Additionally, the rear peripheral edge 116 may incorporate a top rear edge 119 defined at the intersection between the rear wall 106 and the roof or top wall 112 of the enclosure 100.

It should be appreciated that the cargo enclosure 100 may generally define any suitable dimensions. For example, as shown in FIG. 1, the cargo enclosure 100 may define a height 126 in a heightwise direction 127 of the cargo enclosure 100 between the top wall 112 and the bottom wall 114 of the enclosure 100. In addition, as shown in FIG. 2, the cargo enclosure 100 may define a width 128 in a widthwise direction 129 of the cargo enclosure 100 between the opposed sidewalls 108, 110 of the enclosure 100 and a length 130 in the lengthwise direction 115 between the front wall 104 and the rear wall 106 of the enclosure 100.

Moreover, as shown in FIGS. 1-3, the cargo enclosure 100 may, in several embodiments, form part of a trailer configured for use as a tractor-trailer combination. In such embodiments, the cargo enclosure 100 may include or be associated with any suitable trailer-related components, such as landing gear 132, wheels 134, axles 136, a suspension system 138 and/or the like. Additionally, when used in a tractor-trailer combination, the cargo enclosure 100 may be configured to be coupled to or hauled by a tractor 102 having any suitable tractor configuration. For example, as shown in the illustrated embodiment, the tractor 102 may include a cab 140 supported on a chassis 142 and a fifth wheel coupling 144 extending behind the cab 140 for coupling the tractor 102 to the cargo enclosure 100. Additionally, as particularly shown in FIG. 1, the tractor 102 may include an air dam 146 mounted on top of the cab 140.

It should be appreciated that, in other embodiments, the cargo enclosure 100 may correspond to or form part of any other suitable transport vehicle and/or transport/storage system. For example, the cargo enclosure 100 may correspond to or form part of the rear storage enclosure of a straight or box truck. In another embodiment, the cargo enclosure 100 may correspond to or form part of a railway car or boxcar, a motorhome, bus, cab-over-type vehicle and/or any other suitable movable storage compartment or space, regardless of whether the compartment/space is pulled, pushed or self-propelled.

In accordance with aspects of the present subject matter, one or more rear fairing assemblies 200 may be installed at or adjacent to the rear peripheral edge 116 of the cargo enclosure 100 defined around the perimeter of the rear wall 106 of the cargo enclosure 100 to reduce the amount of drag acting on the enclosure 100 as it is being transported. For example, as shown in FIG. 3, one or more side fairing assemblies 200A may installed at or adjacent to one or both of the side rear edges 117, 118 defined at the interface between the rear wall 104 and the sidewalls 108, 110 of the enclosure 100. Similarly, one or more top fairing assemblies 200B may be installed at or adjacent to the top rear edge 119 of the cargo enclosure 100 defined at the interface between the rear wall 106 and the roof 112. It should be appreciated that, for purposes of description, the disclosed side fairing assemblies 200A and top fairing assemblies 200B will be generally referred to herein as fairing assemblies 200.

Figure 4:
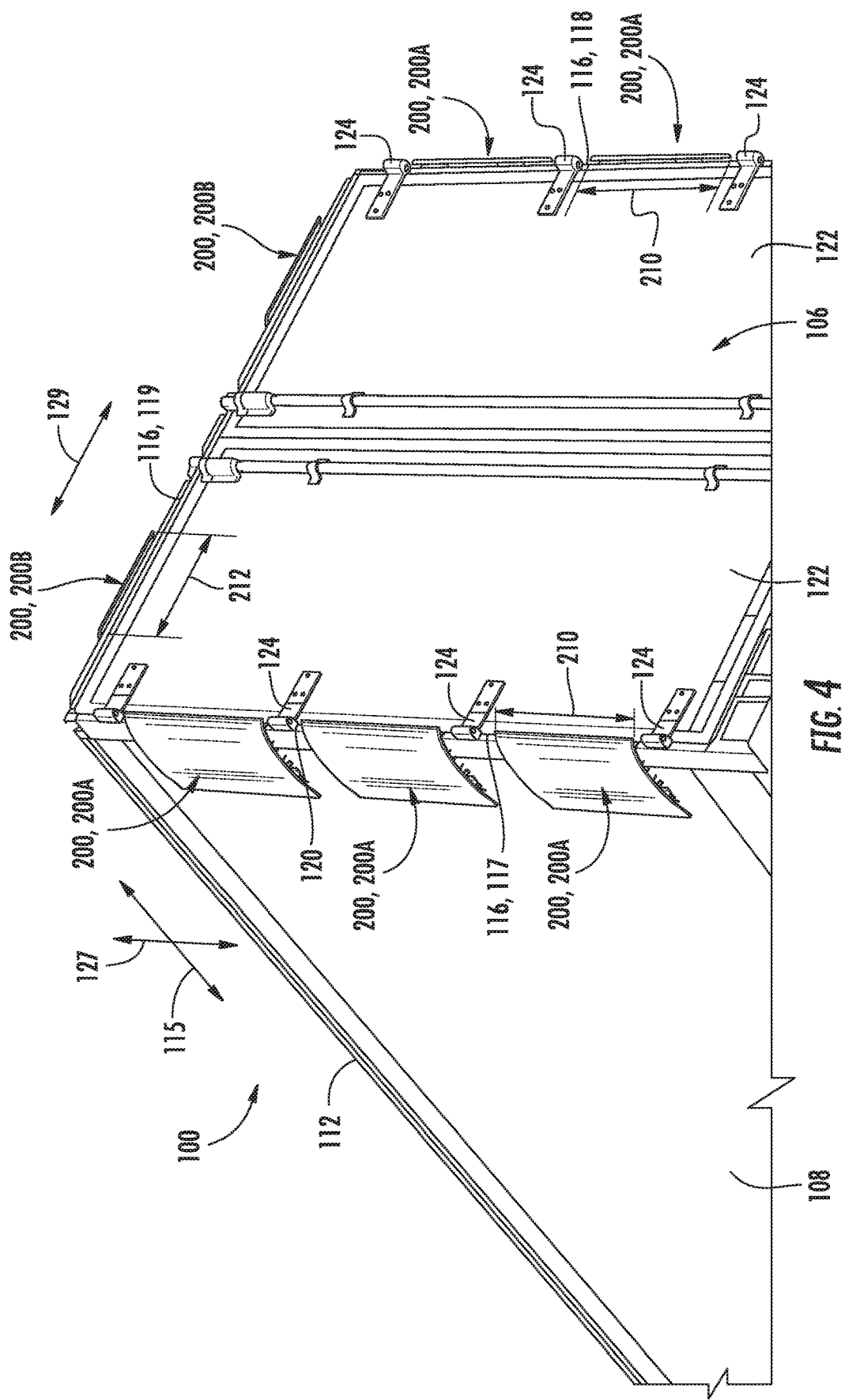
FIG. 4 illustrates another perspective view of the rear of the cargo enclosure shown in FIG. 3.

Referring now to FIGS. 4 and 5, perspective views of a portion of the rear of the cargo enclosure 100 shown in FIGS. 1-3 are illustrated in accordance with aspects of the present subject matter. Specifically, FIG. 4 illustrates a partial perspective view of the rear of the cargo enclosure 100, particularly illustrating a plurality of rear fairing assemblies 200 installed adjacent to the rear peripheral edge 116 of the enclosure 100. Additionally, FIG. 5 illustrates the same perspective view of the cargo enclosure 100 as that provided in FIG. 4, except that one of the fairing assemblies 200 (e.g., one of the side fairing assemblies 200A) is shown in exploded form to illustrate the various components of the assembly 200.

It should be appreciated that, in several embodiments, the rear wall 106 of the cargo enclosure 100 may be defined at least partially by a rear door frame 120 and/or one or more rear doors 122 of the cargo enclosure 100. For instance, as shown in FIGS. 4 and 5, the cargo enclosure includes two doors 122 hingedly coupled to the rear door frame 120 via a plurality of hinge mechanisms 124. In such an embodiment, the rear wall 106 of the cargo enclosure 100 may, for example, by defined by the rearwardly facing walls or surfaces of the rear door frame 120 and/or the doors 122.

As shown in FIGS. 4 and 5, a plurality of fairing assemblies 200 may be installed relative to the rear peripheral edge 116 of the cargo enclosure 100. Specifically, in the illustrated embodiment, the cargo enclosure 100 includes three separate side fairing assemblies 200A (only two of which are shown relative to the second sidewall 210) spaced apart from one another along each sidewall 108, 110 of the enclosure 100 and two top fairing assemblies 200B spaced apart from each other along the top wall 112 of the enclosure 100, with each fairing assembly 200 being installed relative to its adjacent enclosure wall 108, 110, 112 such that the fairing assembly 200 at least partially extends beyond or hangs over the rear peripheral edge 116 of the enclosure 100. However, in other embodiments, any other suitable number of fairing assemblies may be installed relative to the rear peripheral edge 116 of the cargo enclosure 100, such as by installing less than three side fairing assemblies 200A or greater than three side fairing assemblies 200A along each sidewall 108, 110 of the enclosure 100 and/or by installing less than two side fairing assemblies 200B or greater than two side fairing assemblies 200B along the top wall 112 of the enclosure 100.

It should also be appreciated that the disclosed fairing assemblies 200 need not be installed onto a cargo enclosure 100 in the combination shown in FIGS. 4 and 5. For instance, in one embodiment, one or more side fairing assemblies 200A may be installed along one or both sidewalls 108, 110 of the enclosure 100 without inclusion of any top fairing assemblies 200B along the top wall 112 of the enclosure 100. In another embodiment, one or more top fairing assemblies 200B may be installed along the top wall 112 of the enclosure 100 without inclusion of any side fairing assemblies 200A along either sidewall 108, 110 of the enclosure 100. In yet another embodiment, one or more side fairing assemblies 200A may be installed along only one of the sidewalls 108, 110 of the enclosure 100 while one or more top fairing assemblies 200B are installed along the top wall 112 of the enclosure 100.

As particularly shown in FIG. 4, each side fairing assembly 200A may generally define a height 210 in the heightwise direction 127 of the cargo enclosure 100. The height 210 selected for each side fairing assembly 200A may generally vary based on, for example, aerodynamic considerations, the specific configuration of the rear of the enclosure 100, the desired wall coverage, and/or the desired number of fairing assemblies to be installed along each sidewall 108, 110 of the enclosure, etc. For instance, in one embodiment, a single side fairing assembly 200A may be installed along each sidewall 108, 110 that has a height 210 generally equal to or slightly less than the height 126 of the enclosure 100 such that the side fairing assembly 200A extends along all or substantially all of the distance defined between the top and bottom walls 112, 114 of the enclosure 100. In another embodiment, the height 210 of each side fairing assembly 200A may be selected based on, for example, the heightwise distance defined between adjacent door hinges 124 positioned along the rear wall 106 of the enclosure 100. For instance, as shown in FIG. 4, each side fairing assembly 200A defines a height 210 that is less than the heightwise distance defined between the door hinges 124 such that each side fairing may 210 be installed at a location between each adjacent pair of hinges 124 in the heightwise direction 127 of the enclosure 100.

Similarly, as shown in FIG. 4, each top fairing assembly 200B may generally define a width 212 in the widthwise direction 129 of the cargo enclosure 100. The width 212 selected for each top fairing assembly 200B may generally vary based on, for example, aerodynamic considerations, the specific configuration of the rear of the enclosure 100, the desired wall coverage, and/or the desired number of fairing assemblies to be installed along the top wall 112 of the enclosure 100, etc. For instance, in one embodiment, a single top fairing assembly 200B may be installed along the top wall 112 that has a width 212 generally equal to or slightly less than the width 128 of the enclosure 100 such that the top fairing assembly 200B extends along all or substantially all of the distance defined between the opposed sidewalls 108, 110 of the enclosure 100. In another embodiment, the width 212 of each top fairing assembly 200B may be selected based on, for example, the width of each door 122 forming part of the rear wall 106 of the enclosure 100. For instance, each top fairing assembly 200B may define a width 212 that is equal to or less than the width of each door 122 such that each top fairing assembly 200B may be aligned with and installed directly above one of the doors 122.

As will be described in greater detail below, each fairing assembly 200 may generally include an aerodynamic fairing or fairing skin 202 and one or more separate fairing brackets 204 configured to support the fairing skin 202 relative to the adjacent enclosure wall 108, 110, 112. For instance, as shown in FIG. 5, the fairing assembly 200 shown in exploded view includes two brackets 204 configured to be coupled to the adjacent enclosure wall (e.g., the first sidewall 108). In such an embodiment, the fairing skin 202 of the assembly 200 may be configured to be positioned over and coupled to the brackets 204 such that the skin 202 is supported on the cargo enclosure 100 at a desired location relative to the rear peripheral edge 116. As indicated above, each fairing assembly 200 may be configured to be installed relative to the cargo enclosure 100 such that the fairing assembly 200 overhangs or extends past the rear peripheral edge 116. For instance, as will be described below, in one embodiment, the aft or trailing ends/edges of both the brackets 204 and the fairing skin 202 of each faring assembly 200 may be positioned rearward of the rear peripheral edge 116 when the fairing assembly 200 is installed relative to the cargo enclosure 100.

It should be appreciated that, although only one of the side fairing assemblies 200A is shown in exploded form in FIG. 5, each of the side fairing assemblies 200A may include the same components and/or may have the same configuration as that described herein. For instance, each side fairing assembly 200A may include a fairing skin 202 and one or more fairing brackets 204 configured to be coupled to the adjacent sidewall 108, 110 to support the skin 202 relative to the sidewall 108, 110. Similarly, each top fairing assembly 200B may include the same components and/or may have the same configuration as that described herein. For instance, each top fairing assembly 200B may include a fairing skin 202 and one or more fairing brackets 204 configured to be coupled to the top wall 112 to support the skin 202 relative to such wall 112 of the enclosure 100.

It should also be appreciated that the specific number of brackets 204 associated with or included within each fairing assembly 200 may generally very depending on the height 210 (in the case of a side fairing assembly 200A) or the width 212 (in the case of a top fairing assembly 200B) of the fairing assembly 200. For instance, a side fairing assembly 200A having a relatively large height 210 may necessitate the use of three or more fairing brackets 204 to support the associated fairing skin 202 relative to the adjacent sidewall 108, 110. Similarly, a side fairing assembly 200A having a relatively small height 210 may only necessitate the use of a single fairing bracket 204 to support the associated fairing skin 202 relative to the adjacent sidewall 108, 110.

Referring now to FIGS. 6 and 7, side views of one of the fairing assemblies 200 described above are illustrated in accordance with aspects of the present subject matter. Specifically, FIG. 6 illustrates an exploded side view of the fairing assembly 200, with the fairing skin 202 exploded away from an associated bracket 204 of the assembly 200. Additionally, FIG. 7 illustrates an assembled side view of the fairing skin 202 and the bracket 294, with the resulting fairing assembly 200 shown as installed relative to the rear peripheral edge 116 of the cargo enclosure 100. The fairing assembly 200 shown in FIGS. 6 and 7 will generally be described with reference to be installed on an "enclosure wall" of the cargo enclosure 100 (referenced as enclosure wall 206 for the sake of simplicity and without intent to limit) relative to the rear peripheral edge 116 and adjacent rear wall 106 of the enclosure 100. It should be appreciated that, as described above, when the fairing assembly 200 is configured as a side fairing assembly 200A, the enclosure wall 206 corresponds to one of the sidewalls 108, 110 of the cargo enclosure 100. Similarly, when the fairing assembly 200 is configured as a top fairing assembly 200B, the enclosure wall 206 corresponds to the top wall 112 of the cargo enclosure 100.

As shown in FIGS. 6 and 7, the fairing skin 202 may, in several embodiments, be formed by a continuous aerodynamic wall or skin body 220 configured to extend in the lengthwise direction 115 of the cargo enclosure 100 between a leading edge 222 and a trailing edge 224. As indicated above, the fairing skin 202 may be configured to be installed relative to the adjacent enclosure wall 206 such that the skin 202 overhangs or extends rearward beyond the rear peripheral edge 116 of the cargo enclosure 100. For instance, as shown in FIG. 7, when fairing skin 202 is installed relative to the cargo enclosure 100 (e.g., via the associated bracket(s) 204), a portion of the skin body 220 overhangs or extends past the rear peripheral edge 116 such that the trailing edge 224 of the fairing skin 202 is positioned rearward of the rear peripheral edge 116 by an overhang distance 226 in the lengthwise direction 115 of the cargo enclosure 100. The leading edge 222 of the fairing skin 202, in contrast, is configured to be positioned forward of the rear peripheral edge 116 in the lengthwise direction 115 of the cargo enclosure 100 (e.g., as shown in FIG. 7).

Additionally, the skin body 220 may generally define an outer face 228 and an inner face 230 of the fairing skin 202. The outer face 228 may generally be configured to face away from the associated bracket(s) 204 of the fairing assembly 200 and the adjacent enclosure wall 206 when the skin 202 is installed thereon and, thus, may generally define the outer surface of the fairing assembly 200. In contrast, the inner face 230 of the skin body 220 may generally be configured to face towards the associated bracket(s) 204 and the adjacent enclosure wall 206. Moreover, the fairing skin 202 may generally define a curved or arcuate profile between its leading and trailing edges 222, 224. For instance, as shown in the illustrated embodiment, due to the arcuate profile of the fairing skin 202, the outer face 228 of the skin body 220 generally defines a curved, aerodynamic surface across which an airflow is configured to be directed when the cargo enclosure 100 is being transported.

The fairing skin 202 may also include one or more features for coupling the skin 202 to the associated fairing bracket(s) 204. For instance, as will be described in greater detail below, the skin body 220 defines an attachment feature (e.g., a hook 232) at the trailing edge 224 of the fairing skin 202 for coupling the skin 202 to the bracket(s) 204 of the fairing assembly 200. Additionally, the fairing skin 202 may include one or more additional attachment features (e.g., mounting posts 234) projecting from its inner face 230 that are configured to be coupled to and/or received within corresponding attachment features of each bracket 204.

Moreover, as particularly shown in FIG. 7, when the fairing assembly 200 is installed relative to the cargo enclosure 100, the body 220 of the fairing skin 202 may extend forward of the bracket 204 in the lengthwise direction 115 of the cargo enclosure 100 such that the leading edge 222 of the fairing skin 202 is positioned directly adjacent to and/or contacts an outer surface 208 of the enclosure wall 206. For instance, as shown in the illustrated embodiment, the skin body 220 may transition from an arcuate profile to a more planar profile at a location adjacent to the leading edge 222 of the fairing skin 202 such that the skin body 220 includes a flat or planar section 236 at the leading edge 222. In such an embodiment, the planar section 236 of the skin body 220 may be configured to sit flush against and/or contact the outer surface 208 of the enclosure wall 206, particularly when an airflow (indicted by arrows 214 in FIG. 7) is directed across the fairing assembly 200. Thus, the airflow may be directed over and across the outer face 228 of the fairing assembly 200 as opposed to flowing between the fairing skin 202 and the enclosure wall 206. Moreover, in addition to providing a contact point between the fairing assembly 200 and the enclosure wall 206, the planar section 236 of the skin body 220 may also provide a location at which the fairing skin 202 may be directly attached to the enclosure wall 206, if desired, such as by adhering the planar section 236 of the skin body 220 to the outer surface 208 of the enclosure wall 206 or by coupling the planar section 236 of the body 220 to the enclosure wall 206 using mechanical fasteners (e.g., rivets, bolts, pins, clips, etc.).

As indicated above, in several embodiments, the fairing skin 202 is formed from a continuous aerodynamic wall or body 220 extending between the leading and trailing edges 222, 224 of the skin 202. In such an embodiment, the fairing skin 202 may, for example, be formed integrally as a single component, such as by manufacturing the skin 202 using as any suitable molding and/or forming technique. Alternatively, the fairing skin 202 may be manufactured as an assembly of components, such as by forming the skin body 220 as two or more walls or body components configured to be separately coupled together.

Referring still to FIGS. 6 and 7, the bracket(s) 204 of each fairing assembly 200 may generally serve as the structural component for the fairing assembly 200 by providing support structure for coupling and retaining the fairing skin 202 relative to the adjacent enclosure wall 206. As show n in the illustrated embodiment, each bracket 204 may generally be formed by a continuous bracket wall 250 configured to extend in the lengthwise direction 115 of the cargo enclosure 100 between a forward end 252 and an aft end 254. In several embodiments, the bracket 20 may be configured to be installed relative to the adjacent enclosure wall 206 such that the bracket 204 at least partially overhangs or extends rearward past the rear peripheral edge 116 of the cargo enclosure 100. For instance, as shown in FIG. 7, when the bracket 204 is installed relative to the cargo enclosure 200, a portion of the bracket 204 overhangs or extends past the rear peripheral edge 116 such that the aft end 254 of the bracket 204 is positioned rearward of the rear peripheral edge 116 in the lengthwise direction 115 of the cargo enclosure 100. The forward end 252 of the bracket 204, in contrast, is configured to be positioned forward of the rear peripheral edge 116 in the lengthwise direction 115 of the cargo enclosure 100 (e.g., as shown in FIG. 7).

Additionally, the bracket wall 250 may generally define an outer surface 256 and an inner surface 258 of the bracket 204. The outer surface 256 may generally be configured to face towards the fairing skin 202 when the skin 202 is installed on the bracket 205. In contrast, the inner surface 258 of the bracket 204 may generally be configured to face towards the adjacent enclosure wall 206 of the cargo enclosure 100. Moreover, the bracket 204 may generally define a varying profile between its forward and aft ends 252, 254 to accommodate the fairing skin 202 and/or to facilitate coupling the bracket 204 to the adjacent enclosure wall 206. For instance, as shown in FIG. 6, the bracket wall 250 may include a first lengthwise section 260 extending from its aft end 254 that defines a curved or arcuate profile generally matching or conforming to the curved or arcuate profile of the fairing skin 202. As a result, when the fairing skin 202 is installed relative to the bracket 204, the fairing skin 202 may extend directly adjacent to and be supported by the curved lengthwise section 260 of the bracket 204. For instance, as shown in FIG. 7, the inner face 230 of the fairing skin 202 may directly contact the outer surface 256 of the bracket wall 250 along the curved lengthwise section 260 of the bracket 204, thereby allowing the bracket 204 to directly support the fairing skin 202 relative to the enclosure wall 206. Moreover, such direct contact between the bracket wall 250 and the fairing skin 202 along the curved lengthwise section 260 of the bracket 204 may help in maintaining the desired aerodynamic shape of the fairing skin 202 as an airflow 214 is directed over the fairing assembly 200.

Moreover, the bracket wall 250 may also define one or more flat or planar lengthwise sections that are configured to directly contact or seat against the outer surface 208 of the enclosure wall 206, thereby providing a contact point(s) between the bracket 204 and the wall 206. For instance, as shown in the illustrated embodiment, the bracket wall 250 includes a second lengthwise section 262 positioned between the first lengthwise section 260 and the forward end 252 of the bracket 204 that defines a flat or planar profile. In such an embodiment, the second lengthwise section 262 of the bracket wall 250 may be configured to extend directly adjacent to and contact the outer surface 208 of the enclosure wall 206. In addition to providing a contact point between the bracket 204 and the enclosure wall 206, the second lengthwise section 262 of the bracket wall 250 may also provide a location for coupling the bracket 204 to the enclosure wall 206. For instance, as shown in FIG. 7, one or more fastener openings 264 may be defined through the second lengthwise section 262 of the bracket wall 250 that is configured to receive one or more suitable fasteners 266 (e.g., one or more rivets, bolts, pins, clips, etc.) to couple the bracket 204 to the enclosure wall 206. Alternatively, the bracket wall 250 may be adhered to the outer surface 208 of the enclosure 206 wall along its second lengthwise section 262. Additionally, as will be described below, the bracket wall 250 may also be shaped so as to define attachment features (e.g., mounting channels 268) for coupling the fairing skin 202 to the bracket 204. In such an embodiment, a bottom section or portion of one or more of the attachment features formed by the bracket wall 250 may, for example, be configured to contact the outer surface 208 of the enclosure wall 206, thereby providing an additional contact point(s) between the bracket 204 and the wall 206.

As shown in FIGS. 6 and 7, the bracket 204 may also include a mounting wall 270 extending outwardly from the bracket wall 250 at a location adjacent to the aft end 254 of the bracket 204. In several embodiments, the mounting wall 270 may serve as a locating feature for the bracket 204. Specifically, as shown in FIG. 7, when the bracket 204 is properly positioned relative to the cargo enclosure 100, the mounting wall 270 may be configured to abut against or otherwise contact a portion of the rear wall 106 of the cargo enclosure 100 at or adjacent to the rear peripheral edge 116. In such an embodiment, when installing the bracket 204 onto the cargo enclosure 100, the bracket 204 may be positioned against the enclosure wall 206 with the mounting wall 270 located rearward or aft of the rear peripheral edge 116 of the enclosure 100. The bracket 204 may then be moved forward in the lengthwise direction 115 of the cargo enclosure 100 until the mounting wall 270 contacts the rear wall 106 of the enclosure 100 at the rear peripheral edge 116, thereby indicating that the bracket 204 is properly located relative to the rear peripheral edge 116. The bracket 204 may then be coupled to the enclosure wall 206 (e.g., at or along the second or flat lengthwise section 262 of the bracket wall 250).

It should be appreciated that, in addition to serving as a locating feature, the mounting wall 270 may also allow for the bracket 204 to be coupled to an adjacent portion of the rear wall 106 of the cargo enclosure 100. For instance, the mounting wall 270 may be adhered to the adjacent portion of the rear wall 160 or may be coupled to the adjacent portion of the rear wall 106 using suitable fasteners (e.g., rivets, bolts, pins, clips, etc.). It should also be appreciated that, when the bracket 204 includes the above-described mounting wall 270, it may be desirable for the wall 270 to be configured to abut against a fixed or stationary portion of the rear wall 106. For instance, when the fairing assembly 200 is configured as a side fairing assembly 200A, the mounting wall 270 may only abut against a portion of the rear door frame 120 (e.g., the same portion of the frame 120 to which the hinges 124 are coupled) or another fixed portion of the rear wall 106 such that the doors 122 do not contact the bracket 204 when pivoted away from their closed position. Similarly, when the fairing assembly 200 is configured as a top fairing assembly 200B, the mounting wall 270 may only abut against a stationary portion of the rear wall 106 located above the doors 122 such that the doors 122 can be opened with the fairing assembly 200 installed.

Referring still to FIGS. 6 and 7, the bracket 204 may also include a plurality stiffening ribs 272 configured to provide additional stiffness or rigidity to the bracket 204. For example, as shown in the illustrated embodiment, the bracket 204 may include a plurality of spaced apart stiffening ribs 272 extending from the bracket wall 250 along the first or curved lengthwise section 260 of the bracket wall 250. In such an embodiment, the stiffening ribs 272 may help retain the curved shape of such lengthwise section 260 of the bracket wall 250, thereby assisting in supporting the adjacent aerodynamically shaped portion of the fairing skin 202. In addition, one or more of the ribs 272 may be configured to extend across the open space or gap 274 defined between the bracket 204 and the enclosure wall 206 along the curved lengthwise section 260 of the bracket wall 250, thereby providing an additional contact point(s) between the bracket 204 and the enclosure wall 206. For instance, as shown in the illustrated embodiment, one of the stiffening ribs 272 (e.g., the forward-most stiffening rib) extends fully across the gap 274 while the remainder of the stiffening ribs 272 only extend partially across the gap 274.

As indicated above, the fairing skin 202 may include attachment features, such as a pair of mounting posts 234 extending inwardly from the inner face 230 of the skin body 220. In such an embodiment, the bracket 204 may define corresponding attachment features for coupling the fairing skin 202 to the bracket 204. For instance, bracket 204 may be configured to define mounting channels 268 configured to receive the mounting posts 234 of the fairing skin 202. Specifically, as shown in FIGS. 6 and 7, the bracket wall 250 is shaped so to include a pair of "U-shaped" mounting channels 268 that are open along the outer surface 256 of the bracket 204, thereby allowing the corresponding mounting posts 234 of the fairing skin 202 to be received within the channels 268. Additionally, as shown in the illustrated embodiment, the bracket 204 may include projections or fingers 276 extending within the interior of each mounting channel 268 that are configured to engage corresponding projections or barbs 238 extending outwardly from each mounting post 234. In such an embodiment, when each post 234 is received within its corresponding mounting channel 268, the post barbs 238 may be pushed past or snapped behind the corresponding channel fingers 276, thereby locking the post 234 within the mounting channel 268 and, thus, preventing the post 234 from backing out of the channel 268 and de-coupling the fairing skin 202 from the bracket 204.

As shown in FIG. 7, a bottom portion 278 of each mounting channel 268 formed by bracket wall 250 may, in one embodiment, be configured to be positioned directly adjacent to and contact the outer surface 208 of the enclosure wall 206 when the bracket 202 is installed relative to the wall 206. In such an embodiment, a plurality of contacts points may be defined between the bracket 204 and the enclosure wall 206 that are spaced apart from one another along the length of the bracket 204. Specifically, in the illustrated embodiment, the bracket 204 is configured to contact the outer surface 208 of the enclosure wall 206 at the forward end 252 of the bracket 204, along the bottom portion 278 of each of the mounting channels 268, along the second or flat lengthwise section 262 of the bracket wall 250, and at one or more of the stiffening ribs 272 (e.g., the forward-most stiffening rib). As a result of such contact points, the bracket 204 may provide maximum structural support for the fairing skin 202 (thereby preventing the fairing assembly 200 from collapsing and maintaining the aerodynamic shape of the fairing skin 202), while minimizing the weight of the associated bracket 204 (e.g., due to the inclusion of the open space or gap(s) 274 defined between the bracket 204 and the enclosure wall 206).

Moreover, as shown in FIGS. 6 and 7, in addition to the mounting channels/posts 268, 234, a further attachment point may be defined between the bracket 204 and the fairing skin 202 at the trailing edge 224 of the skin 202. Specifically, as indicated above, the skin body 220 may be bent or otherwise formed at or adjacent to the trailing edge 224 of the fairing skin 202 such that the skin 202 defines a hook or hooked portion 232 that is configured to wrap around the aft end 254 of the bracket 204. In such an embodiment, when installing the fairing skin 202 into the bracket 204, the trailing edge 224 of fairing skin 202 may be initially positioned adjacent to the aft end 254 of the bracket 204 such that the hooked portion 232 extends or wraps around the aft end 254 the bracket 204. Once the trailing edge 224 of the skin 202 has been "hooked" around the aft end 254 of the bracket 204, each mounting post 234 may be pushed or snapped into its respective mounting channel 268 to complete the assembly of the skin 202 onto the bracket 204.

As indicated above, in several embodiments, the bracket 204 may be formed from a continuous body or wall 250 extending between the forward and aft ends 252, 254 of the bracket 204. In such an embodiment, the bracket 204 may, for example, be formed integrally as a single component, such as by manufacturing the bracket 204 using any suitable molding and/or forming technique. Alternatively, the bracket 204 may be manufactured as an assembly of components, such as by forming the bracket wall 250 as two or more walls or components configured to be separately coupled together.

Additionally, as particularly shown in FIG. 6, the bracket 204 may define a length 280 in the lengthwise direction 115 of the cargo enclosure 100 between its forward and aft ends 252, 254 that is shorter than a corresponding length 240 of the fairing skin 202 defined between the skin's leading and trailing edges 222, 224. As a result, when the fairing skin 202 is installed relative to the bracket 204, the skin 202 may completely extend over and cover the bracket 204 in the lengthwise direction 115 of the enclosure 100. Specifically, as indicated above, the fairing skin 202 may be configured to extend beyond the forward end 252 of the bracket 202 such that the leading edge 222 of the skin 202 is positioned forward of the bracket 202 and contacts the outer surface 208 of the enclosure wall 206. As a result, the airflow 214 flowing along the outer surface 208 of the enclosure wall 206 in front of the fairing assembly 200 may be directed along the outer face 230 of the fairing skin 202 as opposed flowing underneath the fairing skin 202 and across the bracket 204 along the open space or gap 274 defined between the skin 202 and the enclosure wall 206. In addition, as indicated above, the trailing edge 224 of the fairing skin 202 may be configured to wrap around the aft end 254 of the bracket 204, thereby covering the portion of the bracket 204 that overhangs the rear peripheral edge 116 of the cargo enclosure 100.

Referring now to FIG. 8, a perspective view of the bracket 204 described above being installed relative to one of the sidewalls (e.g., the first sidewall 108) of the cargo enclosure 100 is illustrated in accordance with aspects of the present subject matter. As shown, when installing the bracket 204 onto the cargo enclosure 100, the bracket 204 (or a portion thereof) may be initially positioned relative to the cargo enclosure 104 such that the mounting wall 270 of the bracket 202 is located rearward or aft of the portion of the rear peripheral edge 116 define by the first rear side edge 117. The bracket 204 may then be moved forward in the lengthwise direction 115 of the cargo enclosure 100 until the mounting wall 270 contacts the rear wall 106 of the enclosure 100 at the rear peripheral edge 116, 117, thereby indicating that the bracket 204 is properly located relative to the rear peripheral edge 116, 117. The bracket 204 may then be coupled to the sidewall 108, such as by inserting a fastener (e.g., a rivet) through the fastener opening 264 defined through the second lengthwise section 262 of the bracket 204 or by adhering the second lengthwise section 262 of the bracket 204 to the outer surface of the sidewall 108. Additionally, as indicated above, the mounting wall 270 of the bracket 204 may also be coupled to the rear wall 106 of the cargo enclosure 100, such as by adhering the mounting wall 270 to the adjacent portion of the rear wall 106.

Referring now to FIGS. 9 and 10, respective exploded and assembled side views of an alternative embodiment of the fairing assembly 200 described above are illustrated in accordance with aspects of the present subject matter. In general, the fairing assembly 200 is configured similar to the embodiment described above with reference to FIGS. 6 and 7. As such, the same reference characters will be used in FIGS. 9 and 10 to identify the same or similar features of the fairing assembly 200 as those described above.

As shown, the fairing assembly 200 includes a fairing skin 202 formed by a continuous aerodynamic wall or skin body 220 extending in the lengthwise direction 115 of the cargo enclosure 100 between a leading edge 222 and a trailing edge 224 of the skin 202, with the trailing edge 224 configured to be positioned aft or rearward of the rear peripheral edge 116 of the enclosure 100 by a given overhang distance 226 when installed relative to the cargo enclosure 100. Additionally, the fairing assembly 200 includes one or more brackets 204 (one of which is shown) configured to support the fairing skin 202 relative to the adjacent enclosure wall 206. Similar to the embodiment described above with reference to FIGS. 6 and 7, the bracket 202 is formed by a continuous bracket wall 250 extending in the lengthwise direction 115 of the cargo enclosure 100 between a forward end 252 and an aft end 254 of the bracket 204, with the aft end 254 configured to be positioned aft or rearward of the rear peripheral edge 116 of the enclosure 100 when the bracket 204 is installed relative to the cargo enclosure 100. Moreover, as shown in FIG. 9, the bracket wall 250 includes a first lengthwise section 260 defining a curved or arcuate profile generally matching or conforming to the curved or arcuate profile of the fairing skin 202 and a second lengthwise section 262 defining a flat or planar profile to allow such section 262 of the bracket wall 250 to be positioned directly adjacent to and/or contact the outer surface 208 of the enclosure wall 206. As shown in the illustrated embodiment, the bracket 204 further includes many of the various other bracket features described above, such as a mounting wall 270 extending from the bracket wall 250 that is configured to abut against a portion of the rear wall 106 of the enclosure 100 at or adjacent to the rear peripheral edge 116 and a plurality of stiffening ribs 272 extending from the bracket wall 250 across the open space or gap 274 defined between the bracket 204 and the enclosure wall 206.

Furthermore, similar to the embodiment described above, the fairing skin 202 and the bracket 204 include corresponding attachment features for coupling the skin 202 to the bracket 204, such as by configuring the skin 202 to include mounting posts 234 configured to be received within corresponding mounting channels 268 defined by the bracket 202. However, unlike the attachment features described above in which the mounting posts 234 are configured to be snapped into the channels 268, the mounting posts 234 and channels 268 define complementary shapes so to allow the posts 234 to be slidably received within the mounting channels 268. Specifically, in the illustrated embodiment, the posts 234 are configured as circular shaped projections extending outwardly from the skin body 220. In such an embodiment, the mounting channels 268 may be similarly configured as circular-shaped channels. As a result, when installing the fairing skin 202 on the bracket 204, each mounting post 234 may be inserted into its respective mounting channel 268 at one of the ends of the channel 268 and slid along a centerline 282 (FIG. 9) of the channel 268 (e.g., in the direction into and out of the page from the perspective of the view shown in FIGS. 9 and 10) to couple the skin 202 to the bracket 204.

Additionally, unlike the embodiment of the fairing assembly 200 described above in which the mounting channels 268 provide contact points between the bracket 204 and the enclosure wall 206, the bottom 278 of each mounting channel 268 is spaced apart from the outer surface 208 of the enclosure wall 206. In such an embodiment, it may be desirable to configure one or more of the other features of the bracket 204 to provide additional contact points between the bracket 204 and the enclosure wall 206. For instance, in the illustrated embodiment, each of the stiffening ribs 272 is configured to extend fully across the gap 274 defined between the bracket 204 and the enclosure wall 206, thereby providing a plurality of contact points at spaced apart locations along the length of the first lengthwise section 260 of the bracket wall 250.

It should also be appreciated that, unlike the embodiment described above, the fairing skin 202 shown in FIGS. 9 and 10 does not include a hooked feature that is configured to wrap around the aft end 252 of the bracket 204. Rather, in the illustrated embodiment, the fairing skin 202 terminates at the aft end 252 of the bracket 204, with the trailing edge 224 of the fairing skin 202 being located directly adjacent to the aft end 252 of the bracket 204.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fairing assembly installed on a cargo enclosure, comprising:
   a fairing bracket extending in the lengthwise direction between a forward end and an aft end, the fairing bracket being coupled to an enclosure wall of the cargo enclosure adjacent to a peripheral edge of the cargo enclosure such that the forward end of the fairing bracket is positioned forward of the peripheral edge in the lengthwise direction and the aft end is positioned beyond the peripheral edge in the lengthwise direction; and
   a fairing skin supported relative to the enclosure wall via the fairing bracket, the fairing skin extending in the lengthwise direction between a leading edge and a trailing edge, the fairing skin being coupled to the fairing bracket such that the fairing skin extends over and at least partially covers the fairing bracket in the lengthwise direction between the forward and aft ends of the fairing bracket, the trailing edge of the fairing skin being positioned adjacent to the aft end of the fairing bracket at a location beyond the peripheral edge of the cargo enclosure in the lengthwise direction;
   wherein the fairing bracket includes a bracket wall extending in the lengthwise direction between the forward and aft ends of the fairing bracket, the bracket wall being spaced apart from the enclosure wall such that a gap is defined between the bracket wall and the enclosure wall along at least a portion of a length of the fairing bracket.

2. The fairing assembly installed on the cargo enclosure of claim 1, wherein the bracket wall defines an inner surface facing the enclosure wall and an outer surface facing away from the enclosure wall, the fairing skin defining an inner face facing towards the fairing bracket and an outer face facing away from the fairing bracket, the inner face of the fairing skin directly contacting the outer surface of the bracket wall along at least a portion of the length of the fairing bracket.

3. The fairing assembly installed on the cargo enclosure of claim 1, wherein the fairing bracket further comprises a mounting wall extending outwardly from the bracket wall at the peripheral edge of the cargo enclosure such that the mounting wall abuts against a portion of a rear wall of the cargo enclosure when the fairing assembly is installed relative to the enclosure wall.

4. The fairing assembly installed on the cargo enclosure of claim 1, further comprising a plurality of stiffening ribs extending outwardly from the bracket wall towards the cargo enclosure such that each of the plurality of stiffening ribs extends at least partially across the gap defined between the bracket wall and the enclosure wall, the plurality of stiffening ribs being spaced apart from each other in the lengthwise direction.

5. The fairing assembly installed on the cargo enclosure of claim 1, wherein at least a portion of the bracket wall defines an arcuate profile that conforms to an arcuate profile of the fairing skin defined between the leading and trailing edges of the fairing skin.

6. The fairing assembly installed on the cargo enclosure of claim 1, wherein the bracket wall includes a first lengthwise section defining an arcuate profile and a second lengthwise section defining a planar profile, the first lengthwise section being spaced apart from the enclosure wall such that the gap is defined between the bracket wall and the first lengthwise section, the second lengthwise section extending directly adjacent to the enclosure wall.

7. The fairing assembly installed on the cargo enclosure of claim 1, wherein the leading edge of the fairing skin is positioned forward of the forward edge of the fairing bracket in the lengthwise direction.

8. The fairing assembly installed on the cargo enclosure of claim 1, wherein the fairing skin defines an inner face facing towards the fairing bracket and an outer face facing away from the fairing bracket, a portion of the inner face adjacent to the leading edge of the fairing skin directly contacting the enclosure wall.

9. The fairing assembly installed on the cargo enclosure of claim 1, wherein the fairing skin is configured to wrap around the aft end of the fairing bracket at the trailing edge of the fairing skin.

10. The fairing assembly installed on the cargo enclosure of claim 1, wherein the fairing bracket defines a mounting channel in which is received a mounting post of the fairing skin for coupling the fairing skin to the fairing bracket.

11. The fairing assembly installed on the cargo enclosure of claim 10, wherein the fairing bracket includes at least one projection extending within the mounting channel, the at least one projection engaging a portion of the post when the post received in the mounting channel.

12. The fairing assembly installed on the cargo enclosure of claim 10, wherein the mounting channel and the post define complementary shapes such that the post is slidably received within the mounting channel for coupling the fairing skin to the fairing bracket.

13. The fairing assembly installed on the cargo enclosure of claim 1, wherein the fairing bracket contacts the enclosure wall at a plurality of contact points spaced apart in the lengthwise direction between the forward and aft ends of the fairing bracket.

14. The fairing assembly installed on the cargo enclosure of claim 1, wherein the fairing bracket extends across a gap defined between the fairing skin and the enclosure wall, the fairing skin extending over and covering the fairing bracket so as to reduce an airflow flowing through the gap defined between the fairing skin and the enclosure wall.

15. A kit for retrofitting an existing cargo enclosure, the cargo enclosure including a rear wall and an enclosure wall extending from the rear wall towards a front end of the cargo enclosure, the cargo enclosure defining a rear peripheral edge at the interface between the rear wall and the enclosure wall, the kit comprising:
  a rear fairing assembly configured to be installed relative to the enclosure wall, the rear fairing assembly comprising:
    a fairing bracket extending in a lengthwise direction between a forward end and an aft end, the fairing bracket configured to be coupled to the enclosure wall adjacent to the rear peripheral edge of the cargo enclosure such that the forward end of the fairing bracket is positioned forward of the rear peripheral edge in the lengthwise direction and the aft end is positioned rearward of the rear peripheral edge in the lengthwise direction; and
    a fairing skin configured to be supported relative to the enclosure wall via the fairing bracket, the fairing skin extending in the lengthwise direction between a leading edge and a trailing edge, the fairing skin being coupled to the fairing bracket such that the fairing skin extends over and at least partially covers the fairing bracket in the lengthwise direction between the forward and aft ends of the fairing bracket, the trailing edge of the fairing skin configured to be positioned adjacent to the aft end of the fairing bracket at a location rearward of the rear peripheral edge of the cargo enclosure in the lengthwise direction;
    wherein the fairing bracket includes a bracket wall extending in the lengthwise direction between the forward and aft ends of the fairing bracket, the bracket wall configured to be spaced apart from the enclosure wall such that a gap is defined between the bracket wall and the enclosure wall along at least a portion of a length of the fairing bracket, the fairing bracket further comprising a mounting wall extending outwardly from the bracket wall, the mounting wall configured to abut against a portion of the rear wall of the cargo enclosure when the rear fairing assembly is installed relative to the enclosure wall.

16. The kit of claim 15, wherein the bracket wall includes a first lengthwise section defining an arcuate profile generally conforming to an arcuate profile of the fairing skin and a second lengthwise section defining a planar profile, the first lengthwise section configured to be spaced apart from the enclosure wall such that the gap is defined between the bracket wall and the first lengthwise section, the second lengthwise section extending directly adjacent to the enclosure wall.

17. The kit of claim 15, wherein the fairing skin is configured to wrap around the aft end of the fairing bracket at the trailing edge of the fairing skin.

18. The kit of claim 15, wherein the fairing bracket defines a mounting channel configured to receive a corresponding mounting post of the fairing skin in order to couple the fairing skin to the fairing bracket.

19. A fairing assembly installed on a cargo enclosure, comprising:
  a fairing bracket extending in the lengthwise direction between a forward end and an aft end, the fairing bracket being coupled to an enclosure wall of the cargo enclosure adjacent to a peripheral edge of the cargo enclosure such that the forward end of the fairing bracket is positioned forward of the peripheral edge in the lengthwise direction and the aft end is positioned beyond the peripheral edge in the lengthwise direction; and
  a fairing skin supported relative to the enclosure wall via the fairing bracket, the fairing skin extending in the lengthwise direction between a leading edge and a trailing edge, the fairing skin being coupled to the fairing bracket such that the fairing skin extends over and at least partially covers the fairing bracket in the lengthwise direction between the forward and aft ends of the fairing bracket, the trailing edge of the fairing skin being positioned adjacent to the aft end of the fairing bracket at a location beyond the peripheral edge of the cargo enclosure in the lengthwise direction;
  wherein the fairing bracket both defines a mounting channel that receives a corresponding mounting post of the fairing skin and includes a projection extending within the mounting channel that engages a portion of the post received in the mounting channel.

20. A fairing assembly installed on a cargo enclosure, comprising:
  a fairing bracket extending in the lengthwise direction between a forward end and an aft end, the fairing bracket being coupled to an enclosure wall of the cargo enclosure adjacent to a peripheral edge of the cargo enclosure such that the forward end of the fairing bracket is positioned forward of the peripheral edge in the lengthwise direction and the aft end is positioned beyond the peripheral edge in the lengthwise direction; and
  a fairing skin supported relative to the enclosure wall via the fairing bracket, the fairing skin extending in the lengthwise direction between a leading edge and a trailing edge, the fairing skin being coupled to the fairing bracket such that the fairing skin extends over and at least partially covers the fairing bracket in the lengthwise direction between the forward and aft ends of the fairing bracket, the trailing edge of the fairing skin being positioned adjacent to the aft end of the fairing bracket at a location beyond the peripheral edge of the cargo enclosure in the lengthwise direction;
  wherein the fairing bracket defines a mounting channel in which a mounting post of the fairing skin is received, with the mounting channel and the post defining complementary shapes such that the post is slidably received within the mounting channel for coupling the fairing skin to the fairing bracket.

* * * * *